March 21, 1933.  T. BARTHOLOMEW  1,901,891
TREATMENT OF SLAG
Filed June 4, 1929
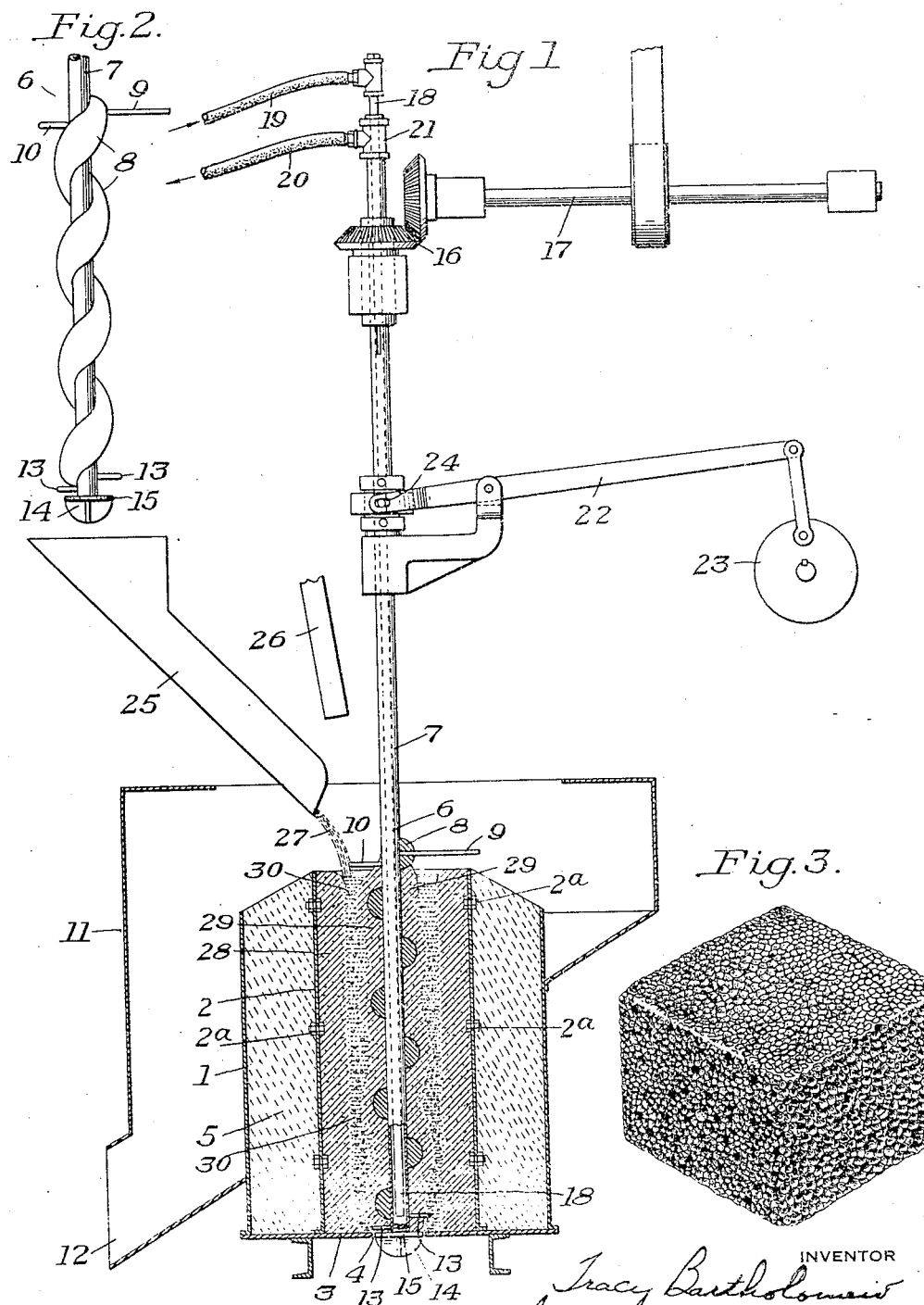

Patented Mar. 21, 1933

1,901,891

UNITED STATES PATENT OFFICE

TRACY BARTHOLOMEW, OF PITTSBURGH, PENNSYLVANIA

TREATMENT OF SLAG

Application filed June 4, 1929. Serial No. 368,358.

The present invention relates to the treatment of slag, and more especially to the agitation of a molten slag containing gases in supersaturated solution, whereby a foam-like cellular slag structure may be produced, although modifications of the treatment may produce either a dense or a spongy structure. The invention also relates to the structure produced by such a treatment and to the apparatus for carrying out the process. Some technicians consider gas in slag as adsorbed rather than as dissolved, and in describing the gases as being in solution in the slag, I intend to include thereby gases whether adsorbed or dissolved.

The molten slag containing gases in solution is stirred or agitated, whereby the gases which exist in a state of supersaturated solution in the slag at the temperature at which it is stirred are coalesced into gas bubbles in the slag. The slag is preferably so cooled under controlled temperature conditions that it is given a viscosity sufficient to hold the bubbles in the molten viscous or plastic slag so that a solidified foam or cellular structure results. If the temperature conditions are so controlled that the slag is sufficiently fluid so that the bubbles formed from the gas released from its supersaturated solution can escape from the slag, the resultant product can be made dense and substantially free from contained gas bubbles. By varying the temperature conditions it is possible to produce a product varying from a light foam or cellular structure, through a heavier cellular structure to a dense structure without gas pockets.

My process lends itself particularly to the production of slag for building blocks or bricks which have light weight, structural strength, high resistance to penetration of moisture, and good heat and sound insulating qualities, and which are specially adapted for use in modern building construction, and particularly in steel frame buildings where a building material of this class is desired.

In the accompanying drawing,—

Figure 1 is an elevation partly in section of a form of apparatus for carrying out my process;

Figure 2 is a detail view of the stirrer; and

Figure 3 is a perspective view of a light foam-like slag block such as can be produced by the process.

The process will now be described with particular reference to the apparatus illustrated in the drawing, it being understood, however, that the process may be carried out with other forms of apparatus.

Referring to the illustrated embodiment of the invention, reference numeral 1 indicates a container in which the molten slag is treated. The container comprises a circular shell 2 closed on the sides and open at the top for the reception of the molten slag. The shell 2 has anchoring projections 2ª extending inwardly to hold the body of congealed slag from turning or being lifted. The container is closed at the bottom by a plate 3 having a central opening 4 through which the treated slag may be discharged. The container is heat insulated with suitable heat insulating material 5. A stirrer 6 is provided for stirring or agitating the slag in the container 1. The stirrer comprises a hollow water cooled tube 7, around which is helically wound a strip 8. The stirrer is also provided with arms 9 and 10 at the upper opening of the container 1 to break up and throw out any slag crusts or material tending to choke the inlet.

A guard 11 having a discharge chute 12 preferably surrounds the upper part of the container to catch any surplus material thrown out by the arms 9 and 10, or any flying spattered slag. The lower end of the stirrer rod is also preferably provided with laterally projecting arms 13 and a downwardly projecting cruciform fin 14 to assist in keeping the discharge opening 4 clear. The lower end of the rod has a circular plate 15 which normally closes the opening 4 when the rod is in its lowered position.

The stirrer rod 7 is continuously rotated through bevel gearing 16 from a suitable source of power, such as the belt driven shaft 17. The cooling water is supplied through the stirrer rod by an internal pipe 18, which projects to the bottom of the stirrer and which is shown as not rotated. Water is supplied to the inner pipe 18 through the flexible hose connection 19 and is discharged through the flexible hose connection 20 connected to the upper part of the rotating circular stirrer rod 7 through the rotatable water fitting 21.

The stirrer 7 is arranged to be vertically reciprocated to intermittently discharge the slag from the container 1, by means of the lever 22, driven by crank 23 and connected to the rod 7 at 24.

The molten slag is preferably tapped from the blast furnace into a transfer and storage ladle or receptacle from which it is poured into the container 1 through the chute 25. In addition to this, a chute 26 may be used if it is desired to admix other materials with the slag.

The operation of the apparatus is as follows: The slag from the chute 25 is discharged in a stream 27 into the upper part of the receptacle. The slag tends to freeze against the shell 2, forming an outer solidified slag layer 28. It also tends to freeze against the stirrer 7, forming an inner slag layer 29, which will have the general contour of a helical screw following the helically wound strip 8. Between the rotating inner slag body 29 and the outer containing slag body 28, the molten slag passes down as the stream 30. It will be understood, of course, that there is no sharply defined dividing line between the solidified slag and the molten slag, but that they merge into each other. As the slag 30 passes downwardly by gravity and also by the screw action of the helix 8, it is subjected to stirring or agitation which is produced by the slippage between the contiguous concentric layers of the slag around the stirrer.

The stirrer rod 7 is given an up and down movement, being drawn upwardly from the position shown in the drawing and then forced downwardly. This serves to intermittently eject the viscous or even plastic molten slag from the bottom of the receptacle.

The slag as it is formed in a blast furnace is under the internal blast furnace pressure, usually in the neighborhood of about fifteen pounds to the square inch above that of the atmosphere. Because of this super-atmospheric pressure, the slag in the furnace can hold in solution more gas than at atmospheric pressure. When the slag is discharged from the furnace into a ladle in which it is quiescent, the gases do not escape readily from the molten slag but exist in a state of super-saturation. The stirring of the slag, however, permits the coalescence of the excess gas held in the super-saturated solution into bubbles which form little gas pockets in the viscous slag.

The tendency of a liquid to hold gas in super-saturated solution and the release of such gas by stirring is illustrated in the commonly observed phenomenon of stirring a glass of carbonated water or beverage, such as ginger ale, with a spoon, which stirring results in the formation of carbon dioxide bubbles from the carbon dioxide gas which existed in a state of super-saturated solution in the water.

As the slag flows downwardly through the agitator it is cooled and thereby rendered more viscous. The viscosity of the slag tends to hold the bubbles in the body of the slag as small gas pockets and prevents their escape to the surrounding atmosphere or coalescence into large size gas pockets. By controlling the cooling of the slag so that it is in a rather thick viscous or plastic condition as it reaches the bottom of the agitator, enough of the gas, which is released from its state of supersaturated solution by the stirring, may be retained in the slag in the form of small bubbles or air pockets so that the slag is discharged in the form of a liquid or viscous foam which freezes or solidifies into a solid foam formed of slag as the continuous or enclosing phase, and gas bubbles or pockets as the dispersed or enclosed phase.

The foamy viscous slag discharged from the agitator may be run into suitable molds and cast into the form of bricks or blocks, where such products are desired, or it may be run out onto a conveyor and then crushed or broken to form a light cellular porous aggregate for use as a concrete aggregate.

While I prefer that the slag used be super-saturated with gas at atmospheric pressure as by production under a higher pressure than that present in the foamer, as in a normal blast furnace operation, my experience indicates that it is possible to foam with this apparatus a slag which is not so initially supersaturated with gas. Molten slag not supersaturated with gas at atmospheric pressure and at the temperature at which it comes from the furnace undoubtedly becomes supersaturated as the cooling progresses toward the solidification point, because the ability of molten slag to retain gases in solution decreases with decrease in temperature. Supersaturation of the slag in the foamer can therefore be secured either by producing or melting the slag under a higher pressure than that maintained in the foamer, or by forming or melting the slag at a temperature materially higher than that of the slag in the foamer, or both.

In Figure 3 is illustrated a small slag block as produced by this process. The block consists of a continuous body of slag which contains small bubbles or gas pockets, as shown in the drawing. An analysis of the gas which is contained in the gas pockets shows about 80% nitrogen and about 15% carbon monoxide when using blast furnace slag, showing that the gas bubbles are formed by the gas which was in solution in the slag in the blast furnace. These gas pockets are substantially uniformly distributed through the material, the material being distinguished by its homogeneous structure and absence of large gas pockets. The size of the gas pockets can be controlled by the amount of stirring and by the temperature. In a typical example, the greater part of the gas pockets averaged between about one-eighth and one-sixteenth of an inch in diameter.

The solidified slag which forms the continuous phase in the gas-slag dispersion, forms continuous films or walls surrounding and sealing the gas pockets, so that while the material has a foam-like cellular structure, it is not pervious to water. A brick of the material may be thrown into a bucket of water and will float indefinitely. The water resisting properties of the material particularly adapts it for blocks or bricks in building construction.

The high and uniformly distributed voids in the material give it a high heat insulating value, which also adapts it for building material.

The weight per unit volume of the product depends upon the amount of gas retained in bubbles in the material, and this amount can be regulated by controlling the temperature and therefore the viscosity and bubble-holding capacity of the slag as it leaves the apparatus.

The amount of gas which is released and retained in the material, and consequently the weight per unit volume of the material, may be regulated by the amount of gas held in a state of supersaturation in the slag as it is treated in the agitator, and the temperature control of the slag which regulates its viscosity and consequent ability to hold the gas bubbles.

I have found that the amount of supersaturation naturally afforded by blast furnace pressures gives an ample amount of gas which can be released during agitation. If such slag is run into the agitator and cooled in the agitator so as to be discharged in a rather thick viscous condition, a considerable part of the released gas may be retained in the slag and a light weight foam-like cellular structure produced. On the other hand, if the cooling during agitation is insufficient to develop such viscosity, the gas which is released by the stirring of the slag can escape from the fluid slag and a dense structure containing substantially no voids or gas pockets can be produced.

The viscosity of the slag may be controlled by varying the input. If the rate of input is relatively small the viscosity may be increased, whereas by relatively large input of highly heated slag the viscosity of the slag as it passes through the agitator and is discharged may be decreased. The viscosity of the slag may also be controlled by the chilling action accomplished by the addition through the chute 26 of cold material, for example fine cold slag in the form of slag meal or granulate. By varying the amount of this admixture the temperature and viscosity of the discharged product may be controlled. Liquids may be added, if desired, to control the temperature. Where the quantity of slag discharged is to be maintained fairly constant the regulation of temperature and viscosity is preferably obtained by such additions. Where the output need not be constant, regulation of the viscosity may be controlled by varying the feed of the slag into the apparatus.

By suitably controlling the viscosity of the slag as it is stirred to form the gas bubbles, the weight per unit volume of the resultant product can be controlled. A material can be made as light as 15 lbs. to the cubic foot, or as dense as 180 lbs. to the cubic foot. The preferred weight is about 40 lbs. to the cubic foot, since this gives sufficient slag in the block for structural strength and at the same time sufficient gas is held to form a light cellular structure, having the general appearance of the block shown in Figure 3 of the drawing.

While for building materials it is preferred to form the cellular structure with unbroken walls between the gas pockets so as to render it impervious to moisture, the intercellular partitions may be partly broken down to form a porous structurre suitable for filter material. This may be done by prolonging the cooling of the slag during agitation until the viscosity of the slag is increased to a point where the walls between the gas pockets are broken down by their surface tension under the agitation.

It will therefore be seen that by suitable temperature control the character of the product may be greatly varied. For example, if the slag is held in a fluid condition during agitation so that the gas bubbles can escape, a dense product may be produced. As the viscosity is increased by suitably controlled and lowered temperatures, the amount of gas bubbles may be increased to produce a block of increased lightness, but having continuous enclosing walls around the gas pockets. As the temperature is still further decreased during agitation these walls may be caused to be ruptured, producing a spongy structure which is pervious to liquids.

The product is uniform or homogenous, that is to say, the gas pockets will average to be of the same order of size and the material is remarkably free from large gas pockets. Any excess quantity of gas or large bubbles developed during the early stages of the agitation can pass up through the more liquid charge at the top of the agitator and out to the atmosphere. The stirring or kneading movement to which the slag is subjected as it passes downwardly through the agitator serves to thoroughly mix and knead together the slag, thus tending to produce the uniform homogeneous product.

The elimination of gas from the slag by the agitating treatment, even when no bubbles are retained, facilitates casting of the slag. Normal blast furnace slags give products which, immediately after casting and during solidification of their interiors, swell, deform and even disrupt, spewing out foamy slag from their interiors. The agitating treatment, whether bubbles are retained or not, tends to obviate this swelling and thereby obviates or minimizes the deformation and swelling in the cast products.

While I have described the process with particular reference to the illustrated embodiment of the apparatus, it will be apparent that other forms of apparatus may be employed to agitate or stir the slag to release the gas under properly controlled temperature and viscosity conditions, and that the invention is therefore not limited to the particular apparatus employed.

While blast furnace slag is tapped from the blast furnace is preferred as the molten slag material, because it can be readily obtained at a low cost and because it inherently has available an adequate amount of gas held in supersaturated solution, other slags may be employed, either natural furnace slags or artificially prepared slags, and it is therefore to be understood that the term "slag" is intended as a term of general definition and not of limitation, and to include various materials which may be artificially made and having the characteristics of slag.

While the preferred embodiment of the invention and the process of treating slag have been specifically described, it is to be understood that the invention may be otherwise embodied and practiced within the scope of the following claims.

I claim:

1. The process of treating molten slag containing a gas in supersaturated solution, which comprises agitating the slag to release the contained gas to form a foam, and retaining at least a part of the gas during the setting of the slag to form a foam-like cellular structure.

2. The process of treating molten slag containing a gas, which comprises agitating the molten slag to produce gas bubbles therein molten slag, while cooling it to a viscosity sufficient to retain at least a part of the gas bubbles in the slag to form a foam.

3. The process of treating molten slag containing gases in solution therein, which comprises releasing the gases held in solution in the slag to form gas bubbles therein, while cooling it under regulated temperature conditions so as to form a homogeneous solid foam.

4. The process of forming a solid foam-like cellular slag structure, which comprises melting slag under pressure so as to form in the slag a gaseous solution supersaturated at atmospheric pressure, and agitating the molten slag at atmospheric pressure while cooling it to a viscous condition so as to liberate the gas from its supersaturated solution and form gas bubbles which are retained in the solidified slag.

5. The process of forming a solid foam-like cellular slag structure, which comprises forming a gas-containing molten slag under pressure, and thereafter agitating the slag under a lower pressure while cooling so as to liberate the gas from its solution and form bubbles which are retained in the viscous body of the slag as it congeals.

6. The process of forming a solid foam-like cellular slag structure from blast furnace slag, which comprises forming the slag in a blast furnace at a super-atmospheric pressure in the usual manner, whereby the slag upon discharge from the furnace contains gases in supersaturated solution at atmospheric pressure, removing the slag from the blast furnace, and thereafter agitating the molten slag at substantially atmospheric pressure while cooling it to a viscous condition so as to liberate the gas from its supersaturated solution and form gas bubbles which are retained in the solidified slag.

7. The process of forming molded porous foam-like cellular slag articles from blast furnace slag, which comprises taking the slag from the blast furnace wherein the slag is formed under a superatmospheric pressure, continuously agitating a flowing stream of such slag containing gases in a supersaturated solution so as to liberate the gases and form gas bubbles while simultaneously cooling the stream of slag to render it sufficiently viscous to retain at least a part of the thus-formed gas bubbles thereby to form a liquid or viscous foam, and casting such foam in molds.

8. The process of producing a porous cellular material from molten slag, which comprises continuously leading into an agitator a molten slag containing dissolved gases and subjecting the molten slag to agitation therein to release the gases while simultaneously cooling the slag to a condipart of the released gases to form a viscous foam, removing the viscous foam from the agitator, and cooling the same to solidification, whereby the foam structure is preserved.

9. The process of treating molten slag containing a gas in supersaturated solution, which comprises agitating the slag in the absence of a substantial amount of moisture to release the contained gas to form a foam, and retaining at least a part of the gas during the setting of the slag to form a foam-like cellular structure.

10. The process of treating molten slag containing a gas in solution, which comprises agitating the molten slag in the absence of a substantial amount of moisture to produce gas bubbles therein from the gas initially contained in the molten slag, while cooling it to a viscosity sufficient to retain at least a part of the gas bubbles in the slag to form a foam.

11. The process of forming a solid foam-like cellular slag structure, which comprises forming a gas containing molten slag under pressure, and thereafter agitating the slag under a lower pressure and in the absence of a substantial amount of moisture while cooling it so as to liberate the gas from its solution and form bubbles which are retained in the viscous body of the slag as it congeals.

12. The process of forming a solid foam-like cellular slag structure from blast furnace slag, which comprises forming the slag in a blast furnace at a superatmospheric pressure in the usual manner, whereby the slag upon discharge from the furnace contains gases in supersaturated solution at atmospheric pressure, removing the slag from the blast furnace, and thereafter agitating the molten slag in the absence of a substantial amount of moisture and at substantially atmospheric pressure while cooling it to a viscous condition so as to liberate the gas from its supersaturated solution and form gas bubbles which are retained in the solidified slag.

In testimony whereof I have hereunto set my hand.

TRACY BARTHOLOMEW.